(12) United States Patent
Ishiguro et al.

(10) Patent No.: US 11,858,748 B2
(45) Date of Patent: Jan. 2, 2024

(54) AUTOMATED FOOD DELIVERY

(71) Applicant: LAB2FAB LLC, Fremont, CA (US)

(72) Inventors: Peter Ishiguro, San Jose, CA (US); Shawn Michael Lange, Walnut Creek, CA (US); Hogan Hall Hempy, Portland, OR (US)

(73) Assignee: Lab2Fab, LLC, Fremont, CA (US)

( * ) Notice: Subject to any disclaimer, the term of this patent is extended or adjusted under 35 U.S.C. 154(b) by 4 days.

(21) Appl. No.: 17/541,938

(22) Filed: Dec. 3, 2021

(65) Prior Publication Data

US 2022/0177233 A1    Jun. 9, 2022

Related U.S. Application Data

(60) Provisional application No. 63/121,693, filed on Dec. 4, 2020.

(51) Int. Cl.
| | |
|---|---|
| *B65G 35/06* | (2006.01) |
| *B65G 3/00* | (2006.01) |
| *B66B 9/00* | (2006.01) |
| *B66B 9/10* | (2006.01) |
| *B65G 37/00* | (2006.01) |

(52) U.S. Cl.
CPC ............. *B65G 35/06* (2013.01); *B65G 37/00* (2013.01); *B66B 9/003* (2013.01); *B66B 9/10* (2013.01); *B65G 2201/0202* (2013.01); *B65G 2201/0258* (2013.01); *B65G 2207/14* (2013.01)

(58) Field of Classification Search
CPC ........ B65G 37/00; B65G 35/06; B65G 47/57; B65G 2207/14; B65G 2201/0202; B65G 2201/0258; E04H 3/02; E04H 3/04; B66B 9/003; B66B 9/10
See application file for complete search history.

(56) References Cited

U.S. PATENT DOCUMENTS

| | | | | |
|---|---|---|---|---|
| 3,610,161 A | * | 10/1971 | Wishart ................. | B65G 35/06 198/619 |
| 4,817,345 A | * | 4/1989 | McGlew ................. | E04B 1/346 52/64 |
| 11,252,970 B2 | | 2/2022 | Anderson et al. | |

(Continued)

FOREIGN PATENT DOCUMENTS

| | | |
|---|---|---|
| CN | 102548455 B | 7/2014 |
| CN | 107752754 A | 3/2018 |

(Continued)

OTHER PUBLICATIONS

International Search Report and Written Opinion for Appln. No. PCT/US2021/061828, dated Mar. 4, 2022.

*Primary Examiner* — James R Bidwell
(74) *Attorney, Agent, or Firm* — Van Hoven PC; Stefan D. Osterbur

(57) ABSTRACT

Example systems and methods for automated delivery of a food and/or beverage from a kitchen may be directed to a first vertically extending elevator configured to transport a payload to and from the kitchen. The payload may include a food and/or a beverage. Example systems also may include a laterally extending conveyor configured to transport the payload laterally from the first elevator to a second elevator. The second elevator is configured to transport the payload from the conveyor to a customer delivery window.

31 Claims, 10 Drawing Sheets

(56) References Cited

U.S. PATENT DOCUMENTS

2002/0104713 A1\* 8/2002 Brown ................. B65G 17/123
                                                        198/701
2020/0407173 A1\* 12/2020 DeMartine ............. B65G 17/48

FOREIGN PATENT DOCUMENTS

| CN | 108402856 | A | 8/2018 | |
|----|-----------|---|--------|---|
| CN | 107055016 | B | 3/2019 | |
| CN | 110029841 | \* | 7/2019 | ............... E04H 3/02 |
| CN | 214526366 | \* | 10/2021 | ............. B65G 35/00 |
| WO | 2014/139508 | \* | 9/2014 | ............. B65G 47/57 |
| WO | 2019/200239 | \* | 10/2019 | ............. B65G 47/10 |

\* cited by examiner

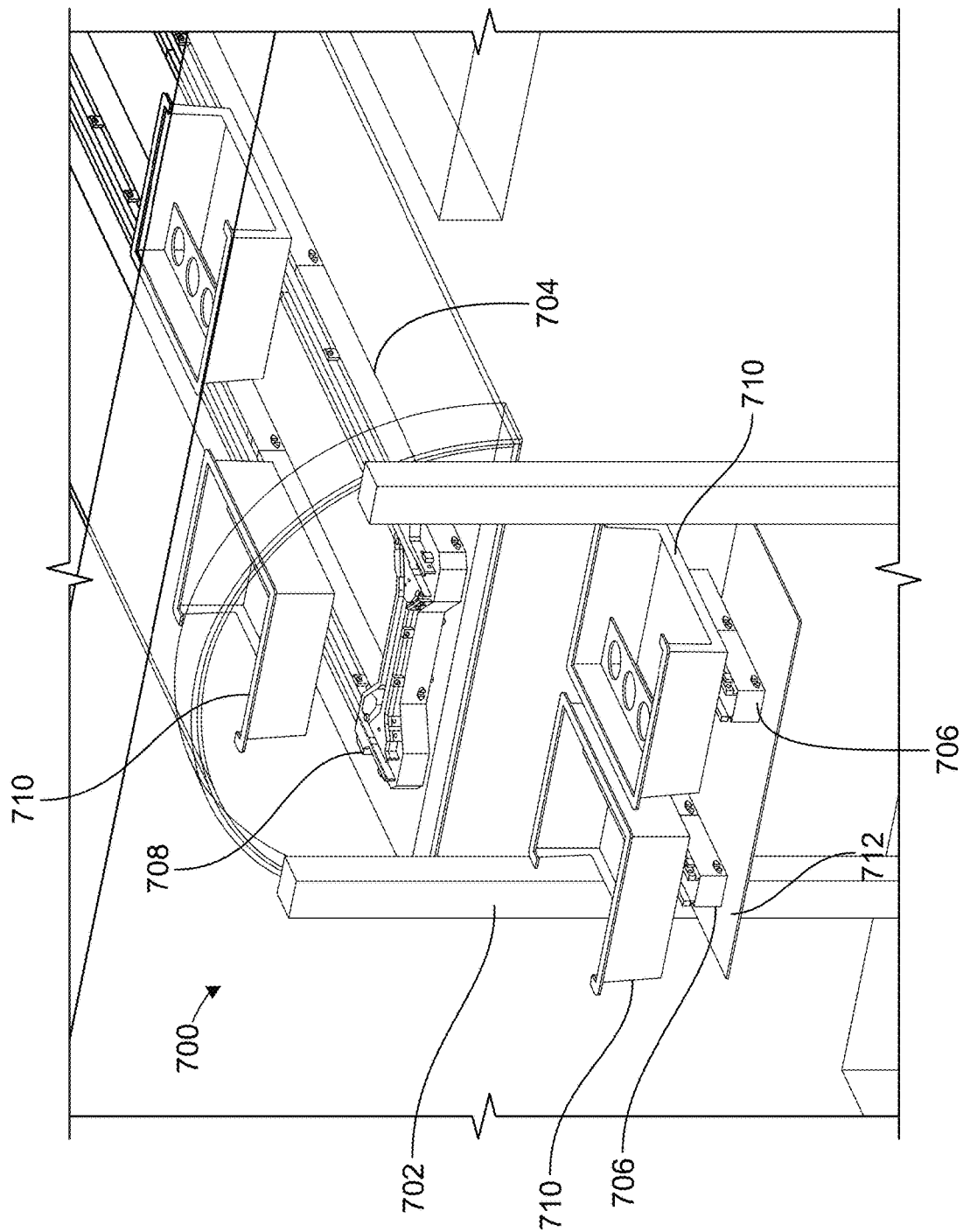

AUTOMATED FOOD DELIVERY

CROSS-REFERENCE TO RELATED APPLICATION

The present application claims priority to U.S. Provisional Patent Application Ser. No. 63/121,693, filed on Dec. 4, 2020, the contents of which are hereby expressly incorporated by reference in its entirety.

BACKGROUND

It has been customary for consumers to place and pick up orders for prepared foods by entering a restaurant or via a drive through. Numerous innovations have occurred in the food service industry over the last few years that change how food is prepared and delivered, such as ghost kitchens, food trucks, and the like. At the same time, consumers and restaurants are interested in limiting face-to-face interaction in some cases based on health and safety concerns. The final delivery of prepared food to customers has been a particularly difficult point to create service efficiencies while maintaining health and safety at a high level, often creating bottlenecks in food service operation that negatively impact customer satisfaction.

SUMMARY

In at least some example illustrations, a system for delivering food from a kitchen includes a first vertically extending elevator configured to transport a payload to and from the kitchen. The payload may include at least one of a food or a beverage. The system also includes a laterally extending conveyor configured to transport the payload laterally from the first elevator to a second elevator. The second elevator is configured to transport the payload from the conveyor to a customer delivery window.

In at least some example illustrations, a method of delivering food from a kitchen includes transporting a first payload from the kitchen along a first vertically extending elevator. The first payload includes at least one of a food or a beverage. The method further includes laterally transporting the first payload from the first elevator along a conveyor to a second elevator, and delivering the first payload from the conveyor to a customer delivery window via the second elevator.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 7A and FIG. 7B each show an exemplary depiction of an interface or junction between a laterally extending conveyor and a vertically extending elevator on a payload loading side of the conveyor, where the elevator includes multiple rail sections and that is configured to hold and transport multiple payloads simultaneously, in accordance with the present disclosure;

DETAILED DESCRIPTION

The present disclosure relates to an integrated system to allow establishments and companies to automatically deliver food to a vehicle lane from a building or kitchen area. The present applicant has developed integrated front-of-house and back-of-house automation systems, in which menu selection, customer orders, inventory, kitchen configuration, food preparation, cleanup, equipment maintenance, employee training and instruction, and other food service operations are integrated and controlled, such as are described in U.S. patent application Ser. No. 16/780,797, filed Feb. 3, 2020, and entitled "Integrated Front-of-House and Back-of-House Restaurant Automation System," and in U.S. Provisional Patent Application Ser. No. 62/819,326, filed on Mar. 15, 2019, each of which are hereby expressly incorporated by reference herein in their entireties. The present disclosure relates to delivery of prepared food and drink items to customers, and may be fully integrated into such a system. For example, orders may be placed and food items may be prepared and queued for the present food delivery system, for example, in movable speed racks accessible to the food delivery system. Automated transfer equipment may place prepared food and drink items in appropriate containers as described herein, and at appropriate times (e.g., based on customer/vehicle location, order priority, etc.) may provide the filled containers to the food delivery system for delivery to the consumer.

In at least some example illustrations described further below, payloads incorporating food and/or beverage items may move independently within an automated delivery system. Merely as examples, a first payload may be loaded and moved along an elevator structure to a laterally extending conveyor. Additional payloads, e.g., for a different customer, may be loaded and moved along the elevator structure while the first payload continues moving along elevator and/or conveyors to its respective customer. The independent movement may advantageously reduce a need to wait for other payloads in the automated delivery system to reach their respective customer before additional payload(s) are loaded into the system. Independent movement of payloads may be effected in any manner that is convenient. In at least some example illustrations below, payloads may travel via a cart or platform that is driven along one or more rail structures. The payloads may be driven, for example, via a magnet and/or electronic field that imparts relative force between the rail and magnet.

Figure 1:
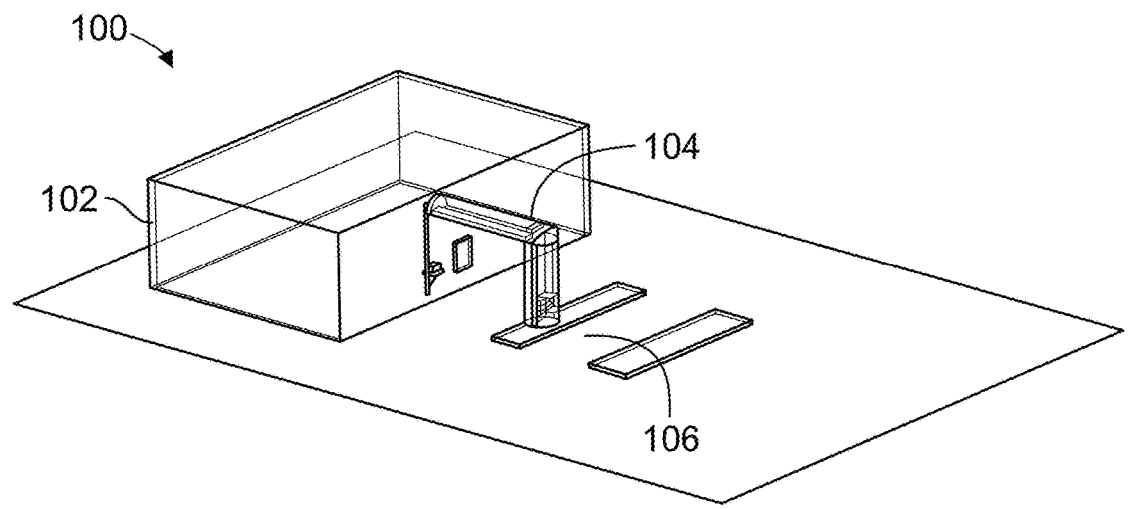
FIG. 1 shows an exemplary illustrative view of a restaurant or business with a traditional drive-thru lane in addition to an automated drive-thru lane, in accordance with some embodiments of the present disclosure.

FIG. 1 shows an exemplary illustrative view of a restaurant operation 100 in accordance with some embodiments of the present disclosure. The restaurant operation 100 shown in FIG. 1 is comprised of a kitchen or payload loading area 102, an automated food delivery system 104, and a customer delivery area 106.

Although this exemplary view of an automated food delivery system 104 shows one drive-through lane within the customer delivery area 106, the automated food delivery system 104 may be comprised of more than one customer delivery areas 106, e.g., with multiple drive-through lanes available for pickup via the automated food delivery system 104.

The automated food delivery system 104 illustrated in FIG. 1 generally comprises a structure built above ground, however, the automated food delivery system 104 as a whole or components therein may alternatively be found underground, e.g., if more convenient based upon desired locations of the payload loading area 102 and the customer delivery area 106. Accordingly, examples herein generally include an elevator configured to raise food/beverage payloads vertically upward from payload loading area 102, e.g., in a kitchen, to facilitate transport of the payloads laterally to a customer delivery area 106, which lowers the payload to a customer. However, example elevators may lower a payload to a conveyor positioned vertically below a kitchen area. Moreover, while kitchen areas described herein are illustrated as being positioned generally at a similar vertical location as a customer delivery window, in other example approaches a kitchen may be positioned at a different vertical height than the customer delivery window, e.g., with the kitchen being disposed underground in a basement area, or in a building level that is above the customer delivery window. In such approaches, automated food delivery system 104 may transport food/beverage payloads from a kitchen queueing area to a customer delivery window, with an elevator or elevators at either a kitchen area or at a customer delivery area that raises or lowers the payload as needed.

Also, the restaurant operation 100 may also include other types of drive-through lanes in addition to the automated food delivery system 104 that do not use the systems or methods within this present disclosure. For example, as illustrated in FIG. 1, a traditional drive-through delivery window 108 may be provided for delivering food/beverages to customers, e.g., at a lane in which customers may drive through in a vehicle.

Generally, the automated food delivery system 104 may allow for a customer to arrive in a vehicle and take delivery of a payload through a window of the vehicle, while the customer remains in their vehicle. Alternatively or in addition, the automated food delivery system 104 may allow for a customer to walk up to the delivery lane to receive food and/or beverages. In some examples, additional delivery lanes may each have an independent elevator, and multiple elevators may be provided within a single delivery lane.

The enclosed payload loading area 102 may be physically connected to the automated food delivery system 104 adjacent the kitchen area. The payload loading area 102 is defined by where the payloads are assembled and loaded into the automated food delivery system 104, as well as where the emptied payload trays return, e.g., after it a food/beverage payload has been transferred to a customer at the customer delivery area 106. In general, the payload loading area 102 will be located in or near the kitchen, where the food is prepared or cooked, however in some embodiments of the present disclosure the payload loading area is solely where the payloads are loaded and not necessarily where the contents of the payload are prepared.

The automated food delivery system 104 may also be physically connected to the customer delivery area 106, in addition to the payload loading area 102. The automated food delivery system 104 is generally an enclosed payload transportation system that connects the payload loading area 102 to the customer delivery area 106. The system allows for payloads to travel between the payload loading area 102 and the customer delivery area 106. Enclosures of the automated delivery system 104 may facilitate, in some examples, environmental control such as temperature, humidity, etc. appropriate for payloads traveling within the automated delivery system 104. In any case, an enclosure of the automated delivery system 104 generally may keep out external elements, weather, etc. at least to an extent to prevent spoilage of payloads.

Payloads transported by the automated food delivery system 104 may be accessible to the customer delivery area 106 by way of a customer access point on a customer-side vertical elevator. The customer delivery area 106 may be used for a customer to unload the contents of their payload that has been delivered from the payload loading area 102 via the automated food delivery system 104.

Figure 2:
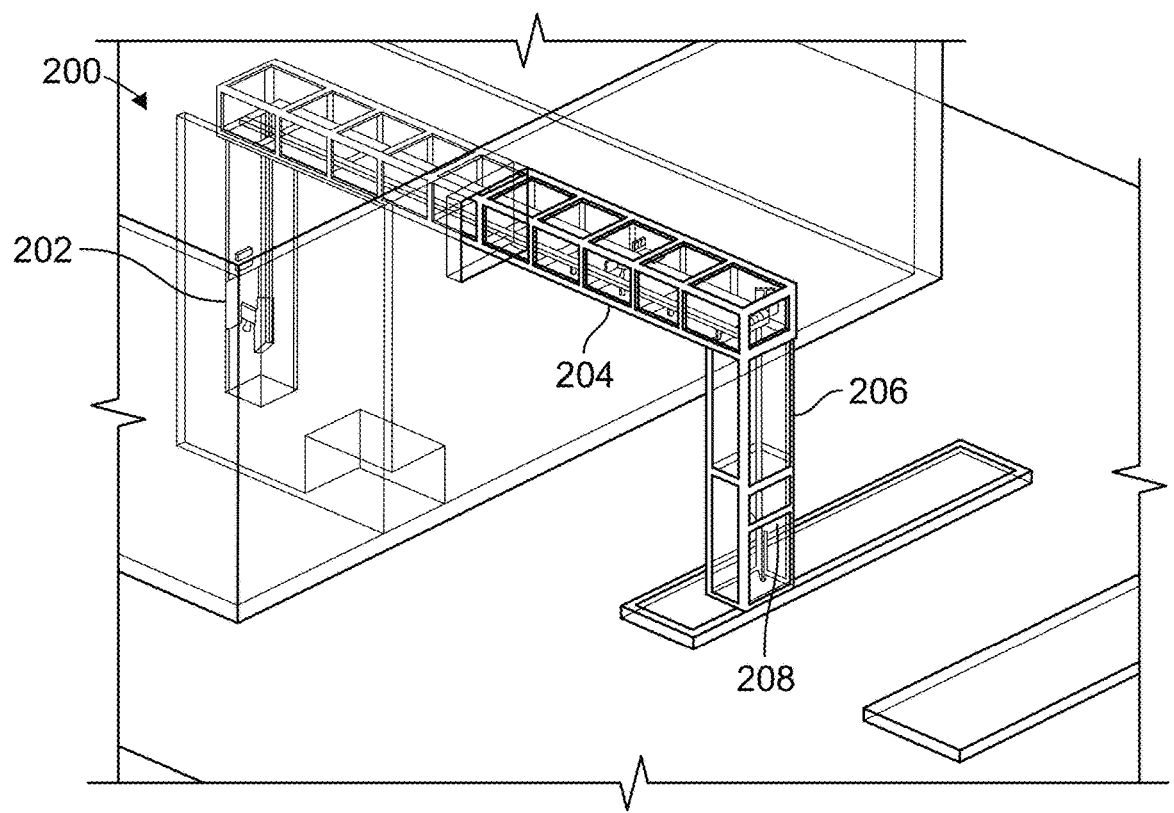
FIG. 2 shows an exemplary illustrative view of an automated food delivery system in accordance with some embodiments of the present disclosure.

FIG. 2 shows another exemplary illustrative view of an automated food delivery system 200 in accordance with some embodiments of the present disclosure. The automated delivery system 200 is comprised of a first vertically extending elevator 202, a laterally extending conveyor 204, a second vertically extending elevator 206, and a customer delivery window 208. In an example, the automated delivery system 200 may be the automated delivery system 104 of FIG. 1. As noted above, example illustrations herein may be incorporated into back-of-house and front-of-house restaurant operations. Accordingly, in at least some examples components such as the elevator 202, conveyor 204, and elevator 206 may be controlled and/or monitored by personnel or a restaurant/system controller, e.g., to coordinate delivery of payloads prepared in a kitchen to customer delivery window 208 or other customer delivery area.

The first vertically extending elevator 202 may be physically connected to the laterally extending conveyor 204. The first vertically extending elevator 202 is generally located where payloads are assembled and then loaded into the first vertically extending elevator 202 for payload transport and delivery. The first vertically extending elevator 202 may be used for moving payloads vertically from a loading area to the laterally extending conveyor 204.

The laterally extending conveyor 204 may physically connect to the first vertically extending elevator 202 at a first end, e.g., near a kitchen operation, and the second vertically extending elevator 206 at a second end thereof, e.g., near customer delivery window 208. The laterally extending conveyor 204 may allow transport of payloads laterally between both vertically extending elevators 202, 206, in both directions. In examples herein, laterally extending conveyors are generally configured to move payloads across the conveyor in any manner that is convenient. Some example approaches employ electromagnetic or magnetic movement systems, however this is not limiting and other approaches or movement systems for a conveyor may be employed.

In some embodiments, queueing and service areas may be located within or adjacent to the conveyor system, e.g., laterally extending conveyor 204. For example, the conveyor system may service multiple elevators accessible to the kitchen and/or customers and may include staging areas, some of which may include heating or cooling functionality as appropriate. In an embodiment, the progress of customer access to the system (e.g., as determined by vehicle location, an application indicating walk-up customer location, and the like), locations within the queue may be changed to optimize delivery to the correct customer at the correct pick-up location. Pick-up locations may be changed, for example, from a drive through to a vehicle waiting area, to efficiently manage and stage customer orders. The conveyor system may thus function as a trunk that queues and transfers food and drink items between different branches of the location to adjust in real time to changing conditions.

The second vertically extending elevator 206 may be physically connected to the laterally extending conveyor 204. Also, the enclosure of the second vertically extending elevator 206 may generally define an opening for a customer delivery window 208. The second vertically extending elevator 206 is generally on the customer side of the automated food delivery system 200. The customer will be able to access the second vertically extending elevator 206 via the customer delivery window 208. The second vertically extending elevator 206 transports payloads vertically from the laterally extending conveyor 204 to an accessible delivery position at the customer delivery window 208. Although this exemplary view of an automated food delivery system has one customer-side elevator in the form of the second vertically extending elevator 206, there may be other embodiments of the present disclosure that include additional vertically extending elevators on the customer side for an expansion in customer delivery locations. Each of these additional vertically extending elevators may also have a respective access point for a customer, e.g., a customer delivery window 208.

The customer delivery window 208 may be defined by an opening in the enclosure of the second vertically extending elevator 206. The customer delivery window 208 may also be defined by as a vertical opening extending from a lower delivery position to an upper delivery position, with a variable range in delivery position that allows for different heights for customer accessibility with respect to a payload and contents thereof. The customer delivery window 208 is used for customer pickup access of payloads from the second vertically extending elevator 206.

Figure 3:
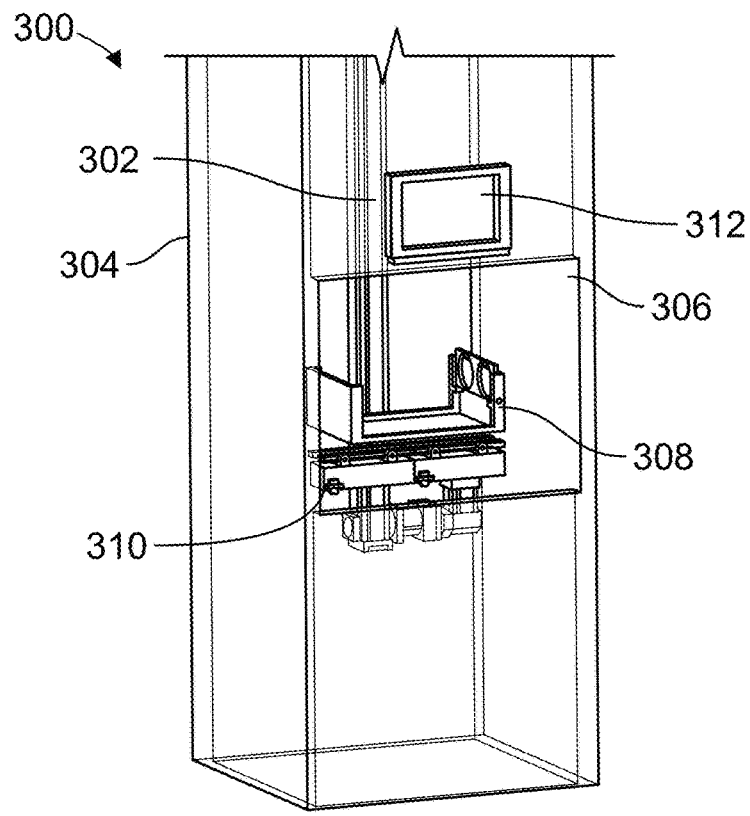
FIG. 3 shows an exemplary depiction of a vertically extending elevator in a payload loading area, in accordance with the present disclosure.

FIG. 3 shows an exemplary depiction of a vertically extending elevator 300 in a payload loading area in accordance with the present disclosure. In an example, the elevator system 300 is the first vertically extending elevator 202 illustrated in FIG. 2. The exemplary depiction of the vertically extending elevator system 300 in FIG. 3 comprises a vertically extending elevator 302, an enclosure 304 defining an access opening 306 to an interior of the first vertically extending elevator 300, a payload tray 308, and a rail section 310.

An interior of the vertically extending elevator system 300 is generally defined by the enclosure 304 and contains the rail section 310 that can translate vertically along the vertically extending elevator 302 within the enclosure 304. The vertically extending elevator 302 may be used for transporting payload trays 308 vertically between the access opening 306 and a laterally extending conveyor (not shown in FIG. 3).

The enclosure 304 generally surrounds the vertically extending elevator 302 in order to contain and protect the payload trays 308 and the contents of a payload. In some example illustrations, the enclosure 304 may be made of a translucent or transparent material, e.g., to aid in troubleshooting repairs or to view payload transportation status.

The access opening 306 to the interior of the first vertically extending elevator 300 may be defined by a vertical opening in the enclosure 304 of the first vertically extending elevator 300. The access opening 306 may allow for loading payloads 308 onto the rail section 310 in the first elevator 300, e.g., to transport the payloads vertically. The access opening 306 may also be used for unloading the payload tray 308 after it has returned from the laterally extending conveyor.

The payload tray 308 may be mounted to a rail guide that allows the tray 308 to connect to and translate along the rail section 310, as will be discussed further below. The payload tray 308 generally holds payload contents (e.g., food items, beverages, etc.) that will be transported throughout the automated food delivery system.

The rail section 310 is configured to translate vertically along the elevator 302. In an example, the rail section 310 attaches to payload trays 308 via a rail guide mounted underneath the payload trays 308, as will be described further below. The rail section 310 may generally hold the payload trays 308 as the payload trays 308 are loaded, as will also be described further below. The rail section 310 also translates vertically along the vertically extending elevator 302 with the payload tray 308, transporting it between the laterally extending conveyor and the access opening 306. The rail section 310 may translate vertically to a position in which it is aligned with other rail sections of a laterally extending conveyor, thereby allowing movement of payloads from the elevator 302 to the laterally extending conveyor, and vice versa.

The elevator system 300 may also have a display 312 or other user interface. The display 312 may provide information on payloads travelling within the system 300, payloads to be loaded, or the like. Additionally, the display 312 may be a touchscreen or have buttons, keyboard, keypads, or other input devices for personnel, e.g., to modify travel of payloads within the elevator system 300.

Figure 4:
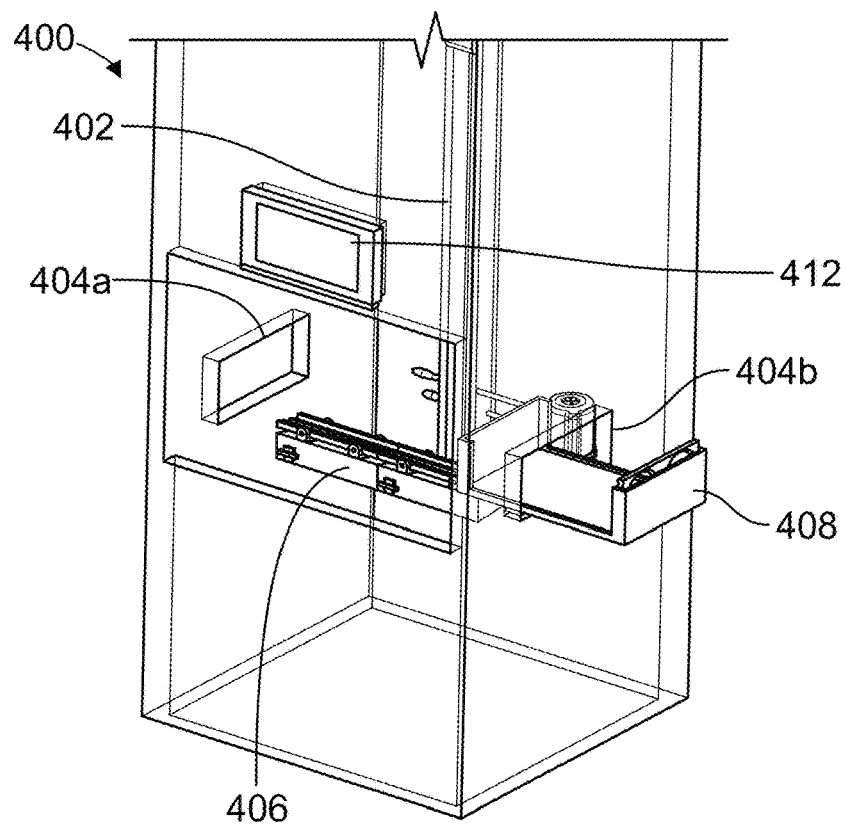
FIG. 4 shows an illustrative depiction of a vertically extending elevator in a payload loading area, in accordance with the present disclosure.

FIG. 4 shows an illustrative depiction of another example vertically extending elevator system 400. In an example, the elevator system 400 is the first vertically extending elevator 202 illustrated in FIG. 2 and is configured to facilitate vertical movement of a payload with respect to a lateral conveyor (not shown in FIG. 4). The exemplary depiction of vertically extending elevator system 400 includes a first vertically extending elevator 402, surrounded by an enclosure 403 which defines a pair of access openings 404a and 404b (collectively, 404). A rail section 406 translates vertically with respect to the elevator 402. Additionally, a payload tray 408 may be transported by the rail section 406.

The vertically extending elevator 402 is encapsulated by the first elevator's enclosure 403. Rail section 406 can translate vertically along the first vertically extending elevator 402. The vertically extending elevator 402 may be used for transporting payload trays 408 vertically between the access opening(s) 404 and a laterally extending conveyor, e.g., laterally extending conveyor 204 (see FIG. 2).

The access openings 404 are laterally positioned in the example of FIG. 4, e.g., to allow for the removal of a payload tray 408 from the rail section 406. For example, payload trays 408 may be removed for repair or cleaning, with the lateral access openings 404 allowing the payload tray 408 to be removed from the rail section 406.

The rail section 406 may be configured to translate vertically along the first elevator 402. The rail section 406 may allow attachment of payload trays 408 via a rail guide mounted underneath the payload trays 408, e.g., as will be described further below. The rail section 406 may also be used to hold the payload trays 408 as the payload trays 408 are loaded. The rail section 406 may also translate vertically along the first vertically extending elevator 402 with the payload tray 408, transporting it between the laterally extending conveyor (e.g., laterally extending conveyor 204) and the access opening(s) 404.

The payload tray 408 may also be mounted to a rail guide that allows the tray 408 to connect to and translate along the rail section 406, as will be elaborated further below. The payload tray 408 may hold payload contents (e.g., food items, beverages, etc.) that will be transported throughout the entire automated food delivery system. The payload tray 408 may be attached to a rail guide that allows the payload tray to translate along the rail section in the first elevator 406, which necessitates the lateral access openings 404 for removal of the payload tray 408 from the rail section in the first elevator 406.

The elevator system 400 may also have a display 412 or other user interface. The display 412 may provide information to personnel, and personnel may also modify travel of payloads within the elevator system 400 or otherwise control the elevator system 400.

Figure 5:
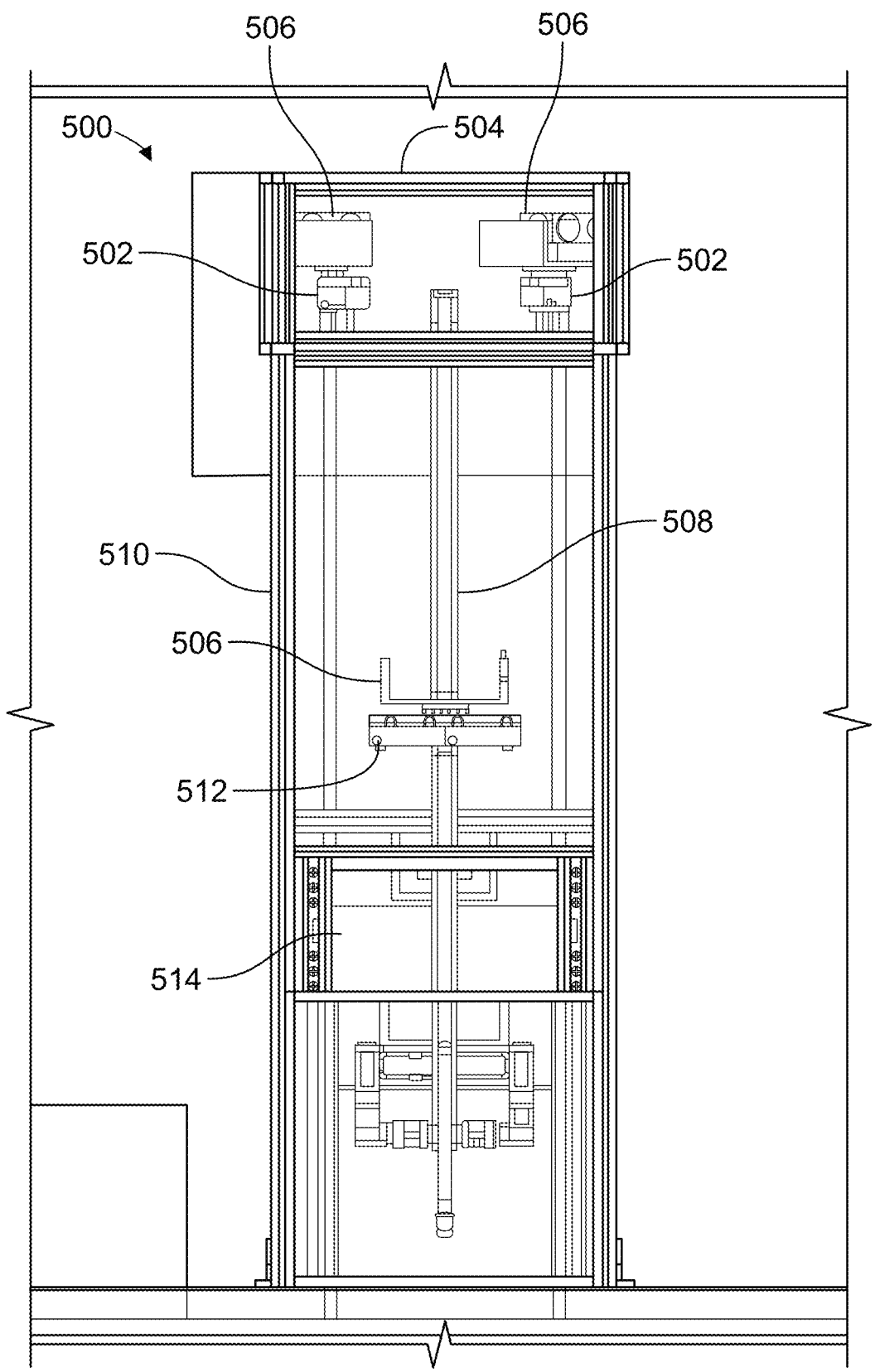
FIG. 5 shows an illustrative view of an exemplary vertically extending elevator positioned at a delivery side of a laterally extending conveyor, in accordance with the present disclosure.

FIG. 5 shows an illustrative view of an exemplary vertically extending elevator for transporting payloads between a laterally extending conveyor and a customer delivery window in accordance with the present disclosure. For example, as illustrated a second vertically extending elevator 500 system may transport payloads 506 between a laterally extending conveyor 502 (enclosed by a laterally extending conveyor enclosure 504) to a customer delivery window 514. In an example, the vertically extending elevator 500 delivers payloads vertically within an enclosure 510 via a movable rail section 512.

An enclosure of the laterally extending conveyor 502 may be physically joined with the second vertically extending elevator 508, e.g., such that payloads 506 travelling from the conveyor 502 to the elevator 508 (and vice-versa) are not exposed to external elements, weather, etc. The laterally extending conveyor 502 may transport payloads 506 between the vertically extending elevator 508 and another vertically extending elevator (not shown in FIG. 5) at an end of the conveyor 502 opposite the elevator 508. In addition, the rail section 512 may align with the laterally extending conveyor 502, e.g., for transferring payloads 506 between the laterally extending conveyor 502 and the second vertically extending elevator 508. In this example, the laterally extending conveyor 502 has two rails. A first rail 502a may transport payloads 506 toward the vertically extending elevator 508, while a second rail 502b transports payloads 506 away from the vertically extending elevator 508, e.g., to another vertically extending elevator. In some example approaches, there may be additional rails or other transport mechanisms enclosed by the laterally extending conveyor enclosure 504, e.g., with the automated food delivery system having multiple second vertically extending elevators 508 for delivery.

The laterally extending conveyor enclosure 504 surrounds the laterally extending elevator 502 and may generally contain and protect the payload trays 506 and the contents of the payload 506 during transport. In some examples, environmental control of an interior of the enclosure 504 may be provided. In other approaches, to the extent an interior of the enclosure 504 is in communication with an interior of a kitchen or other area that is temperature and/or humidity-controlled, such control may affect the interior of the enclosure 504 such that separate environmental control of the interior of the enclosure 504 is not necessary. The laterally extending conveyor enclosure 504 may be made of a translucent or transparent material in order to aid in troubleshooting repairs as well as to view payload 506 transportation status.

The payload 506 may be mounted to a rail guide that allows the payload 506 to connect to and translate along laterally extending conveyor 502 and the rail section in the second vertically extending elevator 508, as will be described in further detail below. The payload 508 holds the payload contents (e.g., food items, beverages, etc.) that will be transported throughout the entire automated food delivery system. After transportation through the system, the contents of the payload 506 may be unloaded via the customer delivery window 514.

The vertically extending elevator 508 may be physically connected to the laterally extending conveyor 502, e.g., such that enclosures of the elevator 508 and conveyor 502 are joined and payloads travelling between the elevator 508 and conveyor 502 are generally not exposed to outside elements, temperature, weather, etc. The enclosure 510 may define an opening for a customer delivery window 514. Also, the vertically extending elevator 508 may be configured to transport a rail section 512, thereby transporting payload(s) 506 between the laterally extending conveyor 502 and the customer delivery window 514. The vertically extending elevator 508 illustrated in FIG. 5 is generally on the customer side of the automated food delivery system, i.e., the customer may access the vertically extending elevator 508 via the customer delivery window 514 when the rail section 512 has moved to a position where the payload 506 is accessible via the customer delivery window 514.

The enclosure 510 generally surrounds the second vertically extending elevator 508, and may generally contain and protect the payload trays 506 and the contents of the payload 506. The enclosure 510 defines an opening for the customer delivery window 514. The enclosure 510 include a translucent or transparent material along a partial or full extent of the elevator 508, which may aid in troubleshooting repairs as well as to view payload 506 transportation status.

The rail section 512 may be connected to the vertically extending elevator 508 such that the rail section 512 can translate vertically along the elevator 508, as noted above. In some examples, the rail section in the first elevator 512 attaches to payload trays 506 via a rail guide mounted underneath the payload trays 506, as will be described in further detail below. In some examples, the rail section 512 can align with the rails 502a and 502b. Also, the rail section 512 may be configured to move away from the rails 502a/502b, e.g., to translate vertically along the vertically extending elevator 508. The rail section 512 may be used to hold the payload trays 506 as the payload trays 506 are delivered and unloaded. The rail section 512 also translates vertically along the vertically extending elevator 508 with the payload 506, transporting it between the laterally extending conveyor 502 and the customer delivery window 514.

The customer delivery window 514 may generally be defined by an opening in the enclosure 510. The customer delivery window 514 may also be defined as a vertical opening extending from a lower delivery position to an upper delivery position. Accordingly, the customer delivery window 514 may facilitate a range of delivery positions at different heights, e.g., to improve customer accessibility with respect to the payload 506. The customer delivery window 514 may be used for customer pickup access of payloads 506 from the second vertically extending elevator 508, and for customers to return unused items, payment for food/beverage payloads, or any other items the customer may need to supply to a restaurant operation that are convenient to deliver via the automated delivery system.

Figure 6:
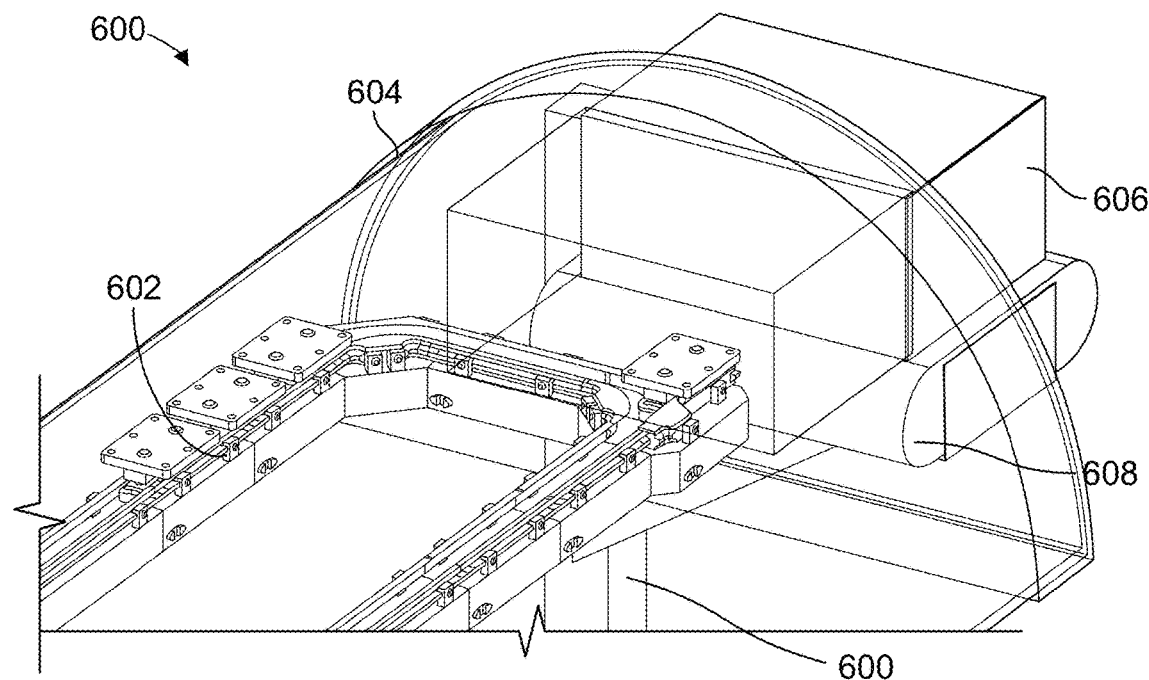
FIG. 6 shows an illustrative view of an exemplary vertically extending elevator adjacent a delivery side of a laterally extending conveyor, where the elevator includes a single rail section, in accordance with the present disclosure.

FIG. 6 shows a junction or interface between a laterally extending conveyor and a vertically extending elevator, in accordance with another example approach. Generally, a vertically extending elevator 600 may include a moveable platform or shelf 608 configured to move vertically to transport payloads to/from a laterally extending conveyor 602. The platform 608 may generally provide a flat and/or horizontal surface to facilitate sliding of a payload 606 or other objects along the surface. In some examples, the platform 608 may also have a pushing/pulling mechanism (not shown) for transferring payload from the elevator to the conveyor and vice versa, e.g., a push bar, fork, or the like. Similarly, the bar/fork may generally pull a carrier or tray back from the conveyor, e.g., to return an empty carrier or tray to a kitchen area after a customer has taken delivery of their food/beverages. Additionally, example shelves or platforms 608 of an elevator, e.g., may be any size or shape that is convenient. As illustrated in FIG. 6, the platform 608 may be "double-wide," i.e., such that the platform 608 may fit two separate payloads 606 onto the elevator 600 for transport. Accordingly, the elevator 600 may be capable of delivering multiple payloads to/from a conveyor in a single trip of the platform 608 to/from the conveyor, increasing the speed at which payloads 606 may be transported between the conveyor and a kitchen area or customer delivery window. It should be noted that in other examples, the platform 608 may be smaller, e.g., to facilitate an overall smaller size of the elevator 600.

The conveyor 602 may have an enclosure 604 generally defining an interior for movement of the payload(s) 606 as the payload(s) 606 moves along the conveyor 602 and/or elevator 600. In an example, the elevator 600 is employed as the first vertically extending elevator 202, and the laterally extending conveyor 602 is the laterally extending conveyor 204, as illustrated in FIG. 2. Generally, a payload 606 may be shifted or slid between the conveyor 602 and the platform 608, as will be discussed further below.

The laterally extending conveyor 602 and/or the enclosure 604 may be physically joined with a corresponding enclosure (not shown) of the vertically extending elevator 600. The laterally extending conveyor 602 may transport the payloads 606 between the vertically extending elevator 600 and a second vertically extending elevator, e.g., at an end of the conveyor 602 opposite that of the elevator 600. In this example, the laterally extending conveyor 602 has multiple rail sections 602a, 602b, 602c, etc. generally forming a loop for travel of payloads 606. A first side of the loop may transport payloads 606 to the elevator 608, while an opposite side of the loop may transport payloads 606 away from the second vertically extending elevator 608.

The enclosure of the laterally extending conveyor 604 may generally encapsulate the laterally extending conveyor 602, e.g., to protect payloads within the conveyor 604 from external elements, weather, or the like. In some example illustrations, the enclosure 604 may be made of a translucent or transparent material in order to aid in troubleshooting repairs, and/or to facilitate observation of payload 606 transportation status.

The payload 606 may be transported on a rail guide that allows the payload to connect to and translate along the rail section in the first vertically extending elevator and laterally extending elevator 602, as will be described further below. The payload 606 may include contents (e.g., food items, beverages, etc.) that will be transported throughout the entire automated food delivery system.

As noted above, in some example approaches a conveyor may transport payloads independently of payload(s) being transported on elevator(s) of an example automated food delivery system, and vice versa. That is, a movement mechanism of the conveyor may be independent of such mechanisms of an elevator. Accordingly, the conveyor may be transporting a payload across the conveyor while the elevator is in movement in a direction away from the conveyor, e.g., returning to a kitchen area to receive an additional payload. In the example illustrated in FIG. 6, elevator 600 may bring payload 606 vertically upward to conveyor 602 using platform 608 that is selectively raised/lowered along the vertical elevator 600. At the same time, a plurality of movable carts 610 or shelves may carry a corresponding plurality of payloads (not shown) around the generally circular loop formed by the rail sections 602. The platform 608 may move payloads 606 vertically up or down with respect to a kitchen area or customer delivery window (not shown in FIG. 6).

Figure 7A:
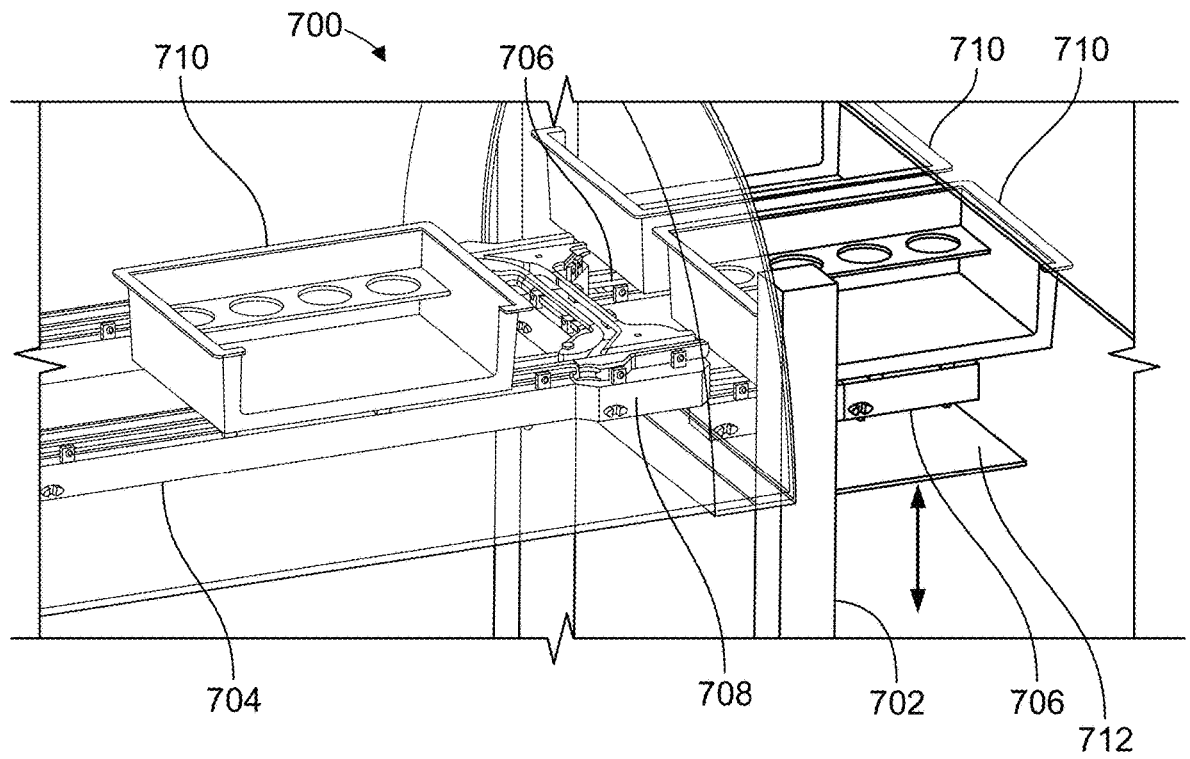

FIG. 7A and FIG. 7B show illustrative views of an exemplary depiction of a junction between a laterally extending conveyor and a vertically extending elevator in accordance with another example illustration. The exemplary junction or interface 700 between the vertically extending elevator 702 and a laterally extending conveyor 704 may include rail sections in the first vertically extending elevator 706, a rail junction 708, and payloads 710. In an example, the elevator 702 is the first vertically extending elevator 202 adjacent a kitchen area, and the laterally extending conveyor 704 is the laterally extending conveyor 204, as illustrated in FIG. 2.

The vertically extending elevator 702 may be physically connected to platform 712 carrying rail sections 706. The rail sections 706 can each translate vertically along the first vertically extending elevator 702. The vertically extending elevator 702 may be used for transporting payload trays 710 vertically between an access opening (not shown in FIGS. 7A/7B) and the laterally extending conveyor 704. The vertically extending elevator 702 may also move payloads 710 independently of the movement of the laterally extending conveyor 704. In some embodiments of the present disclosure, the first vertically extending elevator 702 may have multiple rail sections 706 which are moved with respect to the elevator 702 via platform 712, as best seen in FIG. 7B.

The laterally extending conveyor 704 may be physically connected to or may include rail junctions 708 that allows payloads 710 to move between the rail section(s) 706 and the laterally extending conveyor 704. The laterally extending conveyor 704 may be used to move payloads 710 between the first vertically extending elevator 702 and another vertically extending elevator, e.g., at an opposite end of the conveyor 704. The laterally extending conveyor 704 can move payloads 710 independently of movement of the first vertically extending elevator 702 and the location of the rail section(s) 706. In this example, the laterally extending conveyor 704 has multiple rail sections forming a loop, with one loop transporting payloads 710 away from the vertically extending elevator 702, and a second loop transporting payloads 710 toward the first vertically extending elevator 702. In some embodiments of the present disclosure there may be more than two rails in the laterally extending conveyor 704, e.g., where multiple second vertically extending elevators and/or customer delivery areas are provided.

The rail section(s) 706 may be physically connected to the first vertically extending elevator 702, e.g., via the platform 712, which can translate vertically along the first elevator 702. The rail sections 706 may each attaches to payload trays 710 via a rail guide mounted underneath the payload trays 710, as will be described further below. The rail section 706 translates vertically along the first vertically extending elevator 702 with the payload tray 710 via the platform 712, transporting the payload trays 710 between the laterally extending conveyor 704 and, e.g., an access opening in a kitchen area (not shown in FIGS. 7A/7B). The rail sections 706 can align with rail junctions 708 of the laterally extending conveyor 704. For example, when a rail section 706 is aligned with a rail junction 708, payloads can be moved between the laterally extending conveyor 704 and the rail section 706 via the rail junction 708.

The rail junction 708 may be physically connected to the laterally extending conveyor 704, and may align with and connect to the rail section 706. The rail junction 708 may be used to allow payloads 710 to move between the laterally extending conveyor 704 and the rail section 706.

The payload 710 may be transported on a rail guide that allows the payload to connect to and translate along the rail section 706 and laterally extending elevator 704, as will be discussed further below. The payload 710 may include contents (e.g., food items, beverages, etc.) that will be transported throughout the entire automated food delivery system.

Figure 8:
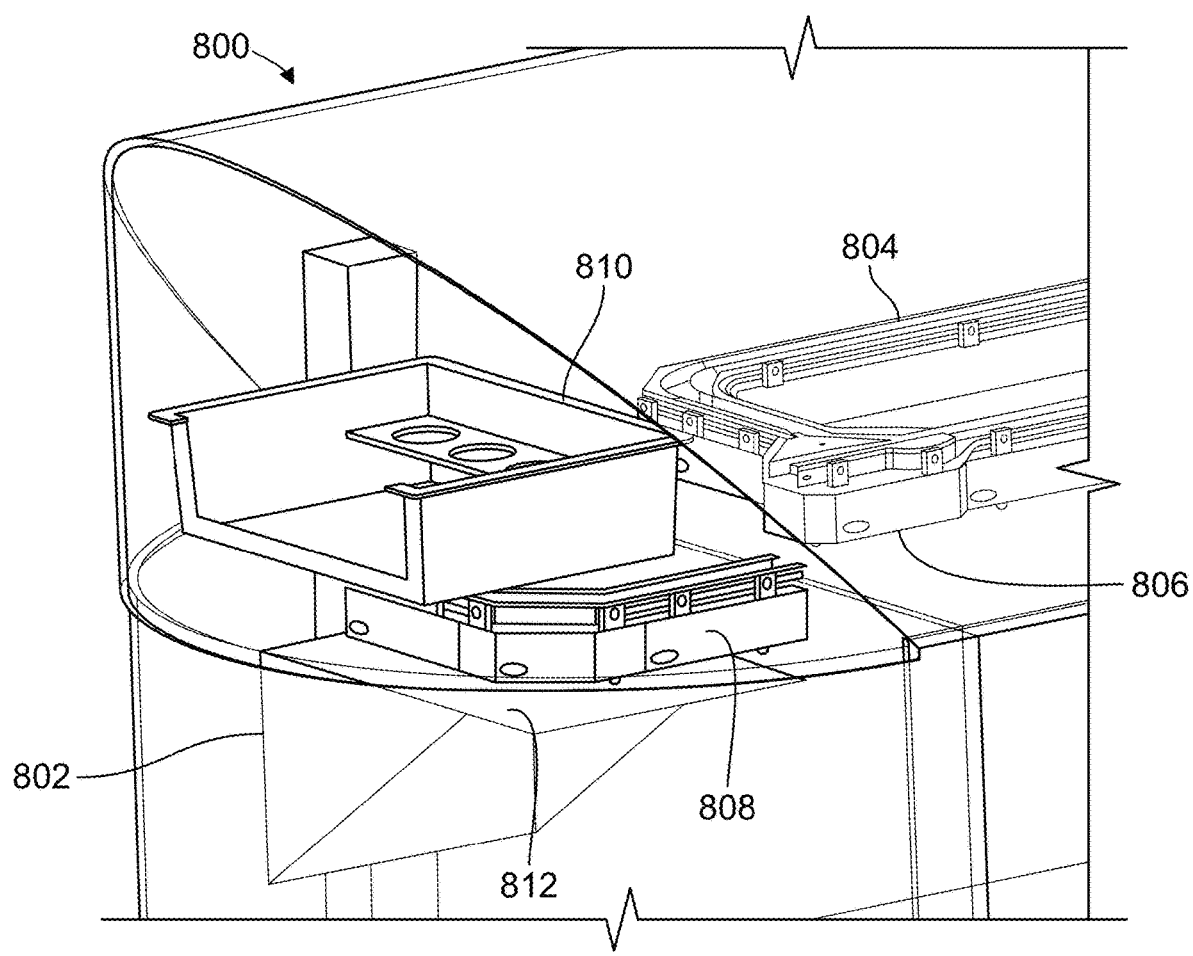
FIG. 8 shows an illustrative view of an exemplary junction between a delivery side of a laterally extending conveyor and a vertically extending elevator, where the elevator includes a single rail section holding a single payload, in accordance with the present disclosure.

FIG. 8 shows an illustrative view of an exemplary junction or interface between a laterally extending conveyor 804 and a vertically extending elevator 802 in accordance with the present disclosure. In an example, the laterally extending conveyor 804 is the laterally extending conveyor 204, and the vertically extending elevator 802 is the second vertically extending elevator 206 of FIG. 2. The exemplary junction between the laterally extending conveyor and the second vertically extending elevator 800 may include a vertically extending elevator 802, a laterally extending conveyor 804, a rail junction 806, a rail section 808, and a payload tray 810.

The vertically extending elevator 802 may be physically connected to a rail section 808. The rail section 808 is configured to translate vertically along the second vertically extending elevator 802, e.g., by way of a movable platform 812 carrying the rail section 808. The second vertically extending elevator 802 may be used for transporting payload trays 810 vertically between an access customer delivery window (not shown in FIG. 8) and the laterally extending conveyor 804. The second vertically extending elevator 802 can move payloads 810 independently of the movement of the laterally extending conveyor 804. While a single elevator 802 is illustrated in FIG. 8, in some examples, the vertically extending elevator 802 may be configured to move multiple payloads 810, e.g., using multiple rail sections 808, additional elevators 802, etc.

The laterally extending conveyor 804 may be physically connected to one or more rail junctions 806. The rail junction 806 may allow payloads 810 to move between the rail section 808 and the laterally extending conveyor 804. The laterally extending conveyor 804 may be used to move payloads 810 to and from the vertically extending elevator 802, e.g., and to/from another vertically extending elevator (not shown in FIG. 8) positioned at an end opposite the elevator 802. The laterally extending conveyor 804 may be configured to move payloads 810 independently of the movement of the vertically extending elevator 802 and the location of the rail section 808. In this example, the laterally extending conveyor 804 has multiple rail sections forming a loop, with one branch of the loop transporting payloads 810 toward the vertically extending elevator 802, and another branch or side of the loop transporting payloads 810 away from the second vertically extending elevator 802 (e.g., to another vertically extending elevator). In some example approaches there may be more than a single loop, or there may be additional rail sections or branches in the laterally extending conveyor 804, e.g., where there are multiple second vertically extending elevators 802 and/or customer delivery areas.

In some examples, the rail section 808 is configured to align with the rail junction 806, to allow a payload to be moved from the conveyor to the platform 812. The rail junction 806 may be physically connected to the laterally extending conveyor 804, and may become aligned with the rail section 808 when the platform 812 brings the rail section 808 to a same vertical height or alignment with the junction 806. The rail junction 806 may, accordingly, be used to allow payloads 810 to move between the laterally extending conveyor 804 and the rail section 808.

The rail section 808 may be supported by the vertically extending elevator 802 and is configured to translate vertically along the second elevator 802. For example, as noted above the platform 812 may move vertically along the elevator 802, thereby moving the rail section 808. The rail section 808 may attach to payload trays 810 via a rail guide mounted underneath the payload trays 810, as will be described further below. The rail section 808 translates vertically along the second vertically extending elevator 802 with the payload tray 810, moving between the laterally extending conveyor 804 and, for example, a customer delivery window (not shown in FIG. 8). The rail sections 808 can align with the rail junctions 806 in the laterally extending conveyor 804. When a rail section 808 is aligned with a rail junction 806, payloads can generally be moved between the laterally extending conveyor 804 and the rail section 808 via the rail junction 806. In other words, the junction 806 may form a continuous track or path between the rail section 808 and rail section(s) of the conveyor 804, allowing the payload 810 to move. The payload 810 may be transported on a rail guide that allows the payload to connect to and translate along the rail section 808 and laterally extending elevator 804, as will be discussed further below. The payload 810 may include contents (e.g., food items, beverages, etc.) that will be transported throughout the entire automated food delivery system.

In FIG. 8, the rail section 808 of the elevator 802 is illustrated having a curved track portion that allows a payload 810 or tray to be moved from the conveyor 804 to the platform 812, and rotated, e.g., to face a customer delivery window. In this manner, payload 810 may be turned or otherwise manipulated to allow relatively easy withdrawal of a food/beverage payload within the tray 810.

Figure 9A:
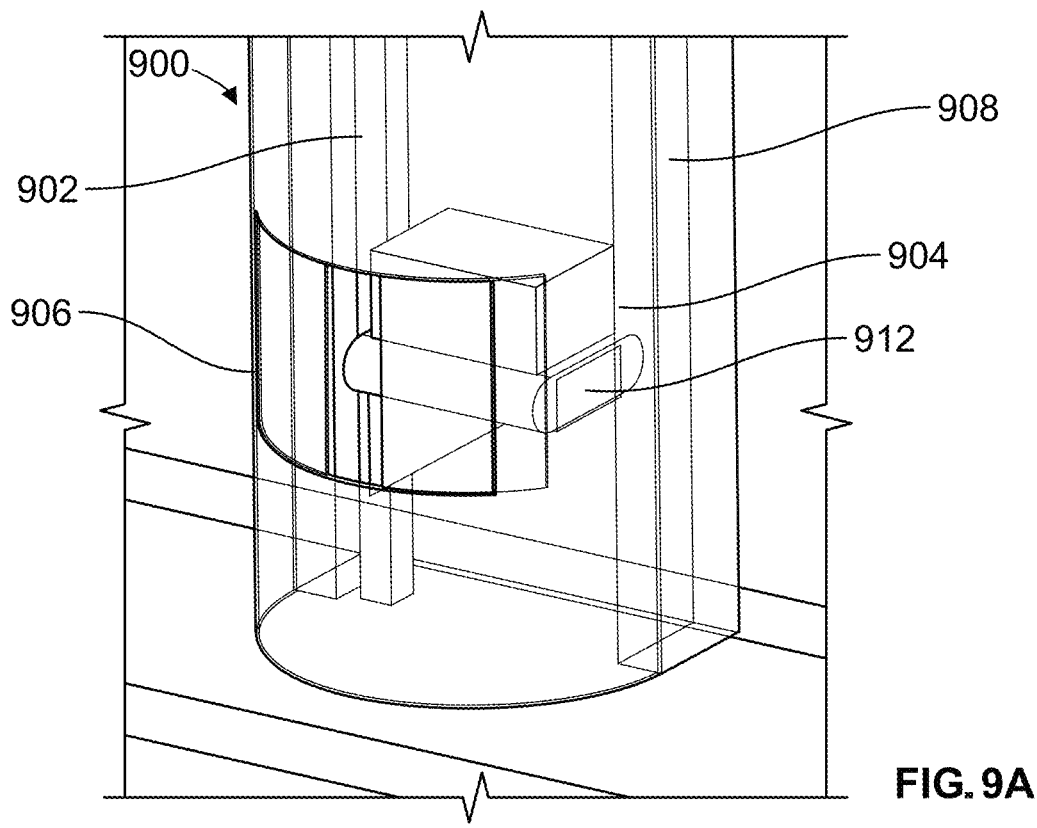
FIG. 9A shows an exemplary depiction of a customer delivery area or window having two doors configured to open/close to selectively allow access to a food/beverage payload, in accordance with the present disclosure.

FIG. 9A shows an exemplary depiction of a customer delivery window in accordance with the present disclosure. The exemplary depiction of the customer delivery window in FIG. 9A includes a vertically extending elevator 902, a payload 904, and a customer delivery window 906. In an example, the vertically extending elevator 902 is the second vertically extending elevator 206 of FIG. 2.

An enclosure 908 902 generally defines an opening for a customer delivery window 906. The customer will generally be able to access payload 904 in the vertically extending elevator 902 via the customer delivery window 906. The vertically extending elevator 902 generally transports payloads vertically from the laterally extending conveyor to an accessible delivery position at the customer delivery window 906.

The payload 904 may include contents (e.g., food items, beverages, etc.) that will be transported throughout the entire automated food delivery system. The payload 904 may be delivered to a customer, who may unload the payload 904 from the customer delivery window 906.

The customer delivery window 906 may generally be defined by an opening in the enclosure 908 of the second vertically extending elevator 902. The customer delivery window 906 may also be defined by as a vertical opening extending from a lower delivery position to an upper delivery position. A range between the upper and lower delivery positions may generally allow for different heights for customer accessibility with respect to the payload and the contents of the payload 904. The customer delivery window 906 may be used for customer pickup access of payloads 904 from the vertically extending elevator 902. In some examples, the customer delivery window 906 will have one or more door(s), curtains, or other closure mechanisms that generally remain closed unless a payload is ready to be unloaded.

Figure 9B:
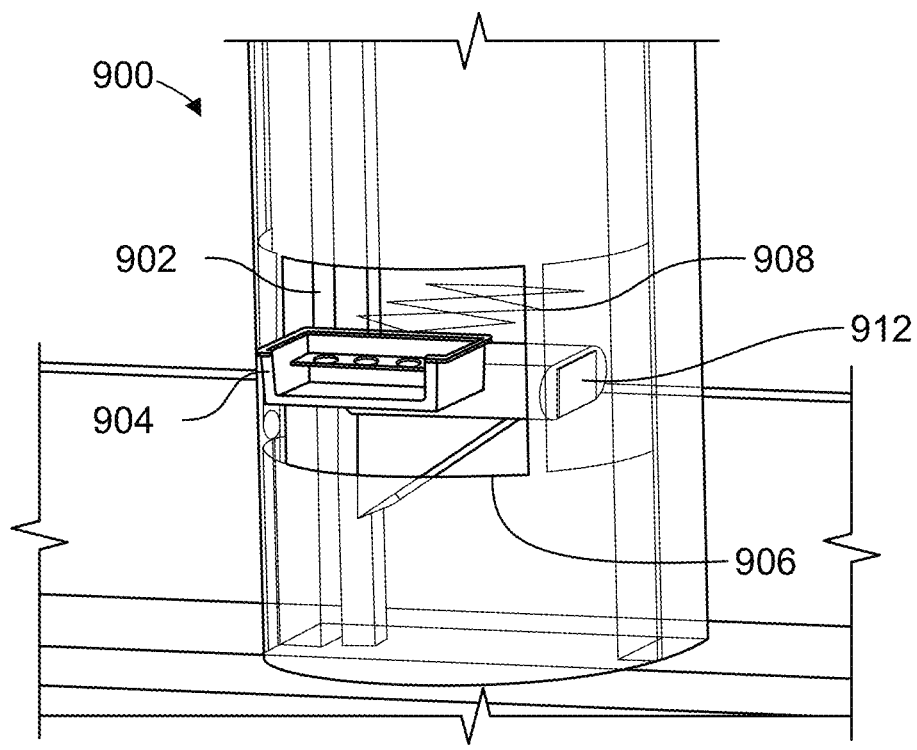
FIG. 9B shows an exemplary depiction of a customer delivery area or window having a mechanism for horizontally extending a food/beverage payload to a customer for retrieval, in accordance with the present disclosure.

As seen in FIG. 9B, in some example approaches there may be a payload extending actuator 908 that is configured to move the payload 904 toward the customer delivery window 906 for the customer to more easily unload the contents of the payload 904. In the example illustrated in FIGS. 9A/9B, the actuator 908 includes a scissor mechanism, which may allow a fork or other tray-grasping device to horizontally extend out toward a customer. In these examples, the actuator 908 may generally slide the payload 904 along the platform 912. Once the contents of the payload 904 are unloaded the payload extending actuator 908 may retract back into the interior of the elevator 902. When the payload extending actuator 908 is retracted, e.g., after a customer removes their food/beverage payload from the tray 904, the platform 912 may translate vertically upward back toward/to along the vertically extending elevator 902.

In other example approaches, various mechanisms may be used to manipulate a tray or payload in an effort to facilitate customer access. For example, a pivoting or rotational platform may be provided that is generally rotated out of an elevator enclosure through a customer delivery window to facilitate a customer receiving their food/beverages. In another example, a conveyor (not shown) is provided to extend the platform of the delivery elevator out of the delivery door(s), facilitating easy access to the food/beverage inside the tray by a customer.

As noted above, door or curtain mechanisms may be provided to enclose the elevator 902 until a payload 904 is ready for customer retrieval. Example delivery door mechanisms may include one or multiple doors, which may move horizontally to allow access to food/beverage payload brought to the customer delivery window. In other example approaches, a single door may be employed, which opens upward, downward, or to either side.

As noted above, example elevator(s) and/or conveyor systems may employ enclosures that generally provide a generally weatherproof delivery of food/beverage payloads from a kitchen area to a customer. Enclosure may be at least partially translucent or may even be transparent. In this manner, mechanisms inside the tunnel may be easily observed for troubleshooting, or to allow customers and/or restaurant personnel a visual indicator of a payload being delivered. Additionally, tunnel enclosures may be at least partially removable, e.g., to allow for cleaning of the tunnel and/or access to system components at various points along the elevator(s) and/or conveyor. Removable components may be tooled or otherwise difficult to remove to prevent damage or vandalism. The tunnel may also have any aesthetic features that are desired, e.g., custom colors/logos, to suit a restaurant or business associated with the automated delivery system. It should be noted that while example enclosures herein generally have a semi-circular or domed outer shape, this is merely illustrative and other shapes/configurations are possible.

Figure 10:
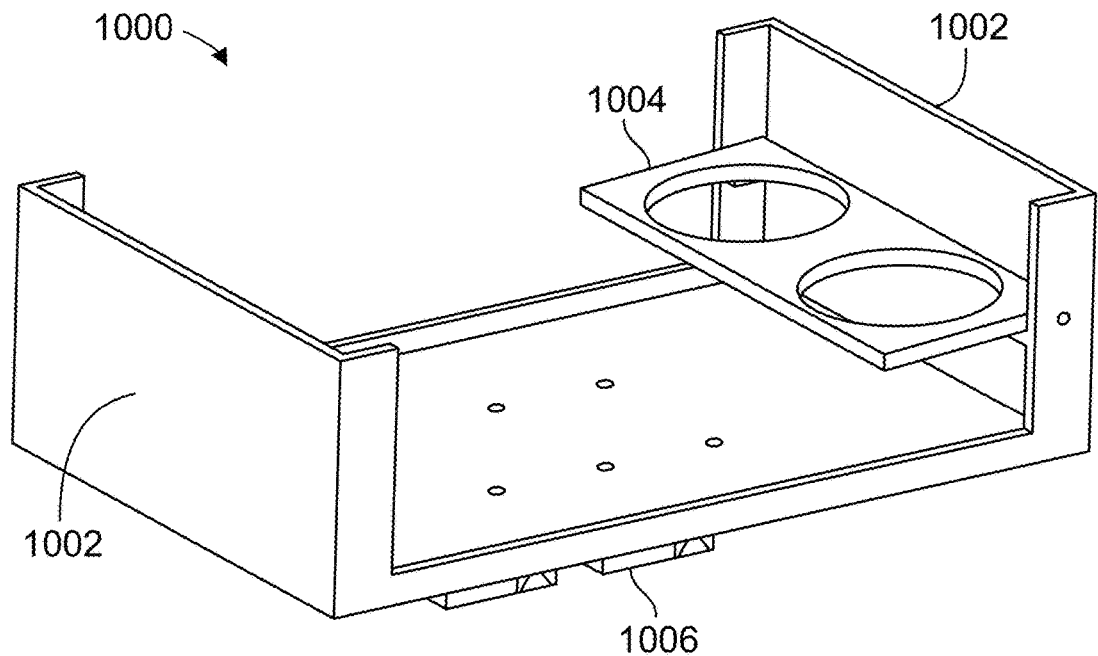
FIG. 10 shows an exemplary illustrative depiction of a payload tray in accordance with the present disclosure.
Figure 11:
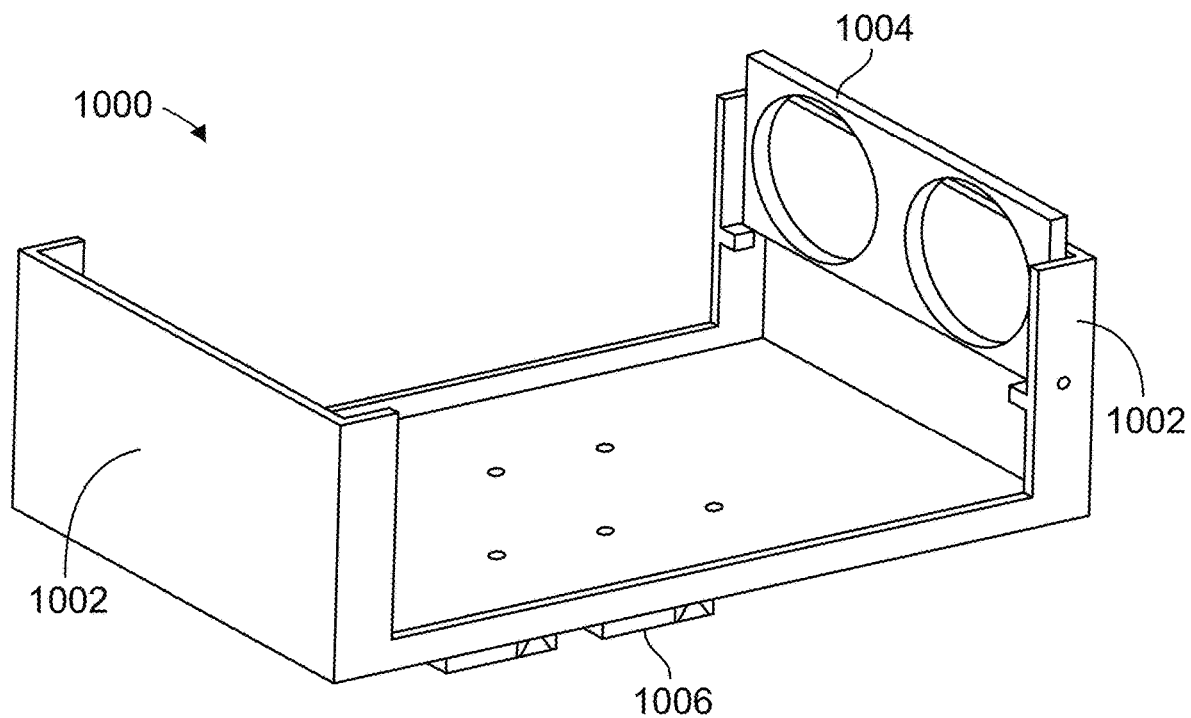
FIG. 11 shows another exemplary illustrative depiction of a payload tray in accordance with the present disclosure.

FIG. 10 and FIG. 11 show exemplary illustrative depictions of a payload tray. The automated food delivery systems herein may generally employ such trays or other carriers to facilitate transport of food and/or beverages. Trays may be reusable, and may facilitate stacking onto each other for storage or when not in use. Trays may also have a lip, e.g., around an outer perimeter of the tray or a portion thereof, or other features to facilitate manipulation or movement along elevator(s) and conveyor(s) of the system, as will be discussed further below. Trays may also define a space that is enclosed, at least horizontally, to generally prevent tipping, spills, etc. of food/beverage payloads. At the same time, the trays may be open vertically and/or may have an open side to facilitate loading/unloading of a payload. Further, trays may have cupholders or other features configured to facilitate secure transport of one or more beverages.

In the example illustrated in FIGS. 10 and 11, the payload tray 1000 includes a plurality of retaining walls 1002, a moveable beverage holder 1004, and a rail guide 1006. The retaining walls 1002 may be physically connected to the moveable beverage holder 1004 and connected to the base of the payload tray 1000. The retaining walls 1002 generally define a content holding area on the tray 1000. The holding area may be accessible, e.g., for loading, between the retaining walls 1002.

Example trays may have modular or reconfigurable features to allow adaptation to different payloads, e.g., removable cupholders to increase/decrease space for beverages instead of food. In the example illustrated in FIGS. 10 and 11, the beverage holder 1004 is movable with respect to the tray 1000, e.g., by being pivotally mounted to a retaining wall 1002. Accordingly, the moveable beverage holder may have at least a first state, in which the holder 1004 is positioned parallel to the base of the payload tray 1000 and may be used to hold beverages (e.g., by inserting into one of the two beverage apertures of the holder 1004 illustrated) as in FIG. 10. In a second state seen in FIG. 11, the holder 1004 may be pivoted or folded up, e.g., against the retaining wall 1002, which may allow for greater space for other contents such as when beverages are not a part of the payload.

Trays may also have features for positively engaging components of the system, e.g., a conveyor cart or elevator platform, thereby increasing security of the payloads, preventing damage/theft, etc. For example, the rail guide 1006 may be physically attached to the payload tray, e.g., via one or more bolts, screws, or the like, or via bonding or any other method of securing the rail guys 1006 to the tray 1000. Additionally, the rail guide 1006 generally attaches to rails of the example automated transport systems, e.g., in the laterally extending conveyor, the first vertically extending elevator, and/or the second vertically extending elevator, as will be described in further detail below. In at least some a rail guide 1006 may have one or more rollers, wheels, or the like to facilitate movement along a lateral conveyor or elevator such as described above. The wheels of the cart may facilitate rolling motion of the cart, e.g., following a track defined by a conveyor or elevator.

As noted above, in various examples herein, rail carriers, rollers, or the like may be used to engage track sections or rails, e.g., on elevators, conveyors, platforms, etc., to positively engage trays or carriers, increasing security of the trays or carriers on the platforms as noted above. For example, rail sections 310 and 406 are carried by respective elevators 302 and 402, to facilitate vertical movement of payloads or trays positioned on the rail sections 310/406 with respect to a laterally extending conveyor. In another example, rail sections 706 are illustrated in FIGS. 7A/7B, which are positioned upon a platform 712 and may be aligned with conveyor 704 to facilitate transfer of payloads/trays between an elevator and the conveyor 704. Accordingly, in the above-described examples, carriers or trays may be positively engaged with corresponding rail sections, and rail sections may be engaged with elevators using similar roller or carrier mechanisms.

Figure 12A:
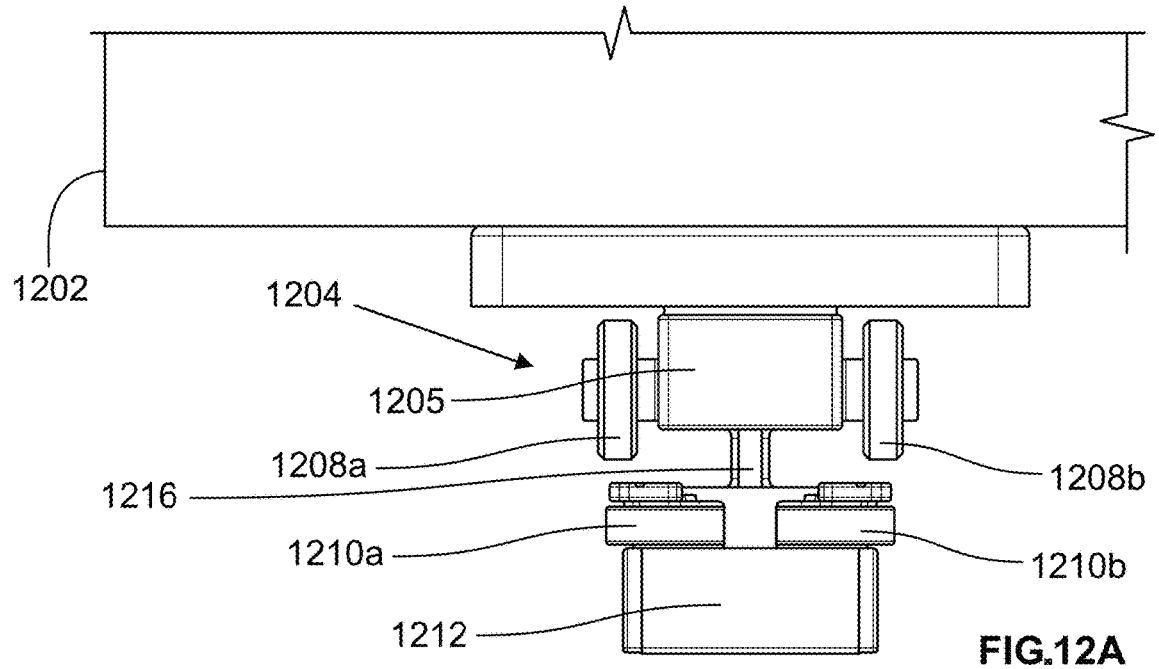
FIG. 12A shows an illustrative depiction of a rail guide attachment of a payload tray in accordance with the present disclosure.
Figure 12B:
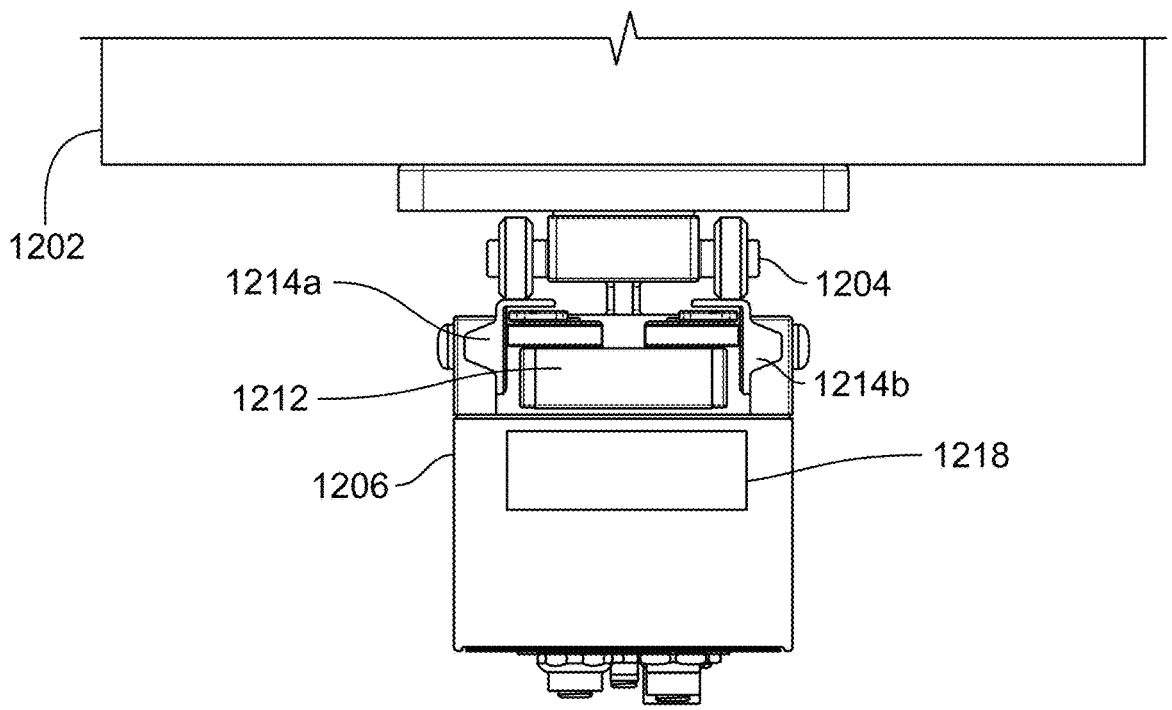
FIG. 12B shows an illustrative view of a connection between a payload tray and a rail in accordance with the present disclosure.

Referring now to FIGS. 12A and 12B, an illustrative example of a rail guide attachment, e.g., for securing a payload tray or rail section, is illustrated and described in further detail. The depiction of the rail guide attachment in FIG. 12A includes a payload tray 1202 and a rail guide attachment 1204. The payload tray 1202 is physically connected to the rail guide 1204, e.g., via fasteners, bonding, or any other method that is convenient. The payload tray 1202 may be used for the transportation of payload contents (e.g., food items, beverages, etc.) throughout the entire automated food delivery system. In an example, the payload tray 1202 is the payload tray 1000 of FIGS. 10 and 11.

The payload tray 1202 may be fixed to the rail guide 1204. Alternatively, the payload tray may be rotatable, and may have a catch or other mechanism for initiating rotation of the tray 1202, e.g., as the rail carrier 1204 is moved along a conveyor or elevator. Accordingly, in some example approaches a tray 1202 may rotate during travel, e.g., along a rail, so that an open side of the tray is adjacent a customer window, access window, or the like.

The rail carrier 1204 may be moveable along a rail section of a component of an automated delivery system via any mechanism that is convenient. In at least some example approaches, payload tray 1202 may move in either direction along a rail section or track formed by multiple rail sections using a magnet and associated electrical/magnetic field. A magnetic movement system may also facilitate control of movement of carts or payloads, e.g., payload tray 1202, to a relatively small resolution, and may allow for carts or payload trays such as tray 1202 to provide an indication or other feedback regarding their position. Further, a magnetic movement system for trays 1202 also may generally facilitate a weatherproof and cleanable delivery system. More specifically, a magnetic movement system may generally be behind a barrier or otherwise sealed from carts or other direct contact with food/beverages, as will be elaborated below. As a result, carts and other areas directly contacting food may generally be cleaned via spraying or other methods without contacting movement systems.

The example rail carrier 1204 may have an upper body 1205, from which one or more rollers are rotatably supported. In the example illustrated, vertically oriented rollers 1208a and 1208b (collectively, 1208) extend from the upper body 1205. A lower body 1212 is supported from the upper body 1205 by a stanchion 1216. Horizontal rollers 1210a and 1210b are rotatably supported from the lower body 1212.

FIG. 12B shows an illustrative view of a connection between a payload tray 1202 and a rail 1206 in accordance with the present disclosure. The connection between the payload tray 1202 and the rail shown in FIG. 12B include a payload tray 1202, a rail guide attachment 1204, and a rail 1206.

The rail guide attachment 1204 is physically connected to the payload tray 1202 and can be inserted into and translate along the rail 1206. The rail guide attachment 1204 is used for the payload tray 1202 to move along the rail 1206, e.g., in the laterally extending conveyor and the rail sections in the first and second vertically extending elevators. The rail guide attachment 1204 is designed to move the payload tray 1202 while also stabilizing it as it moves along the rail 1206.

Rails 1206 may receive rail carriers 1204 are designed to be compatible with the rail guide attachments 1204, wherein the rail guide 1204 can slide along the rail 1206. As best seen in FIG. 12B, the rail carrier 1204 may be rolled along rail section 1206 via a movement mechanism 1218. The movement mechanism may include an electrical circuit or other device for generating a variable magnetic field. The magnetic field may impart force upon one or more magnet(s) within the lower body 1212 of the rail carrier 1204, thereby causing the rail carrier 1204 and associated objects, e.g., payload tray 1202, to move along the rail 1206. The rail 1206 may include a pair of rail members 1214a, 1214b (collectively 1214), which are engaged by the vertical rollers 1208 on an upper surface thereof. The horizontal rollers 1210 also engage interior vertical surfaces of the rail members 1214a, 1214b. In this manner, the rail carrier 1204 remains positively engaged with the rail 1206—i.e., the rail carrier 1204 is generally prevented from being withdrawn from the rail 1206 unless and until the rail carrier 1204 travels to an end portion of the rail 1206.

The rails 1206 may be found in any laterally extending conveyor or vertically extending elevator(s) described above, and may extend in a direction of desired travel of the conveyor/elevator. In example laterally extending conveyor(s), a rail 1206 may be positioned such that a rail carrier 1204 travels along the rail 1206, e.g., between vertically extending elevators positioned at either end of the conveyor. In example elevators, e.g., adjacent a kitchen area or customer delivery window, a rail 1206 may extend vertically between a laterally extending conveyor and an access window or customer delivery window. A rail carrier 1204 may be moved vertically along the rail 1206, e.g., to move a rail section (e.g., rail section 310, 406, or 512)

upward and downward as desired. For example, a position of the rail carrier 1204 along the vertically extending rail 1206 may be controlled via a force imparted to magnet(s) carried by lower body 1212.

Figure 13:
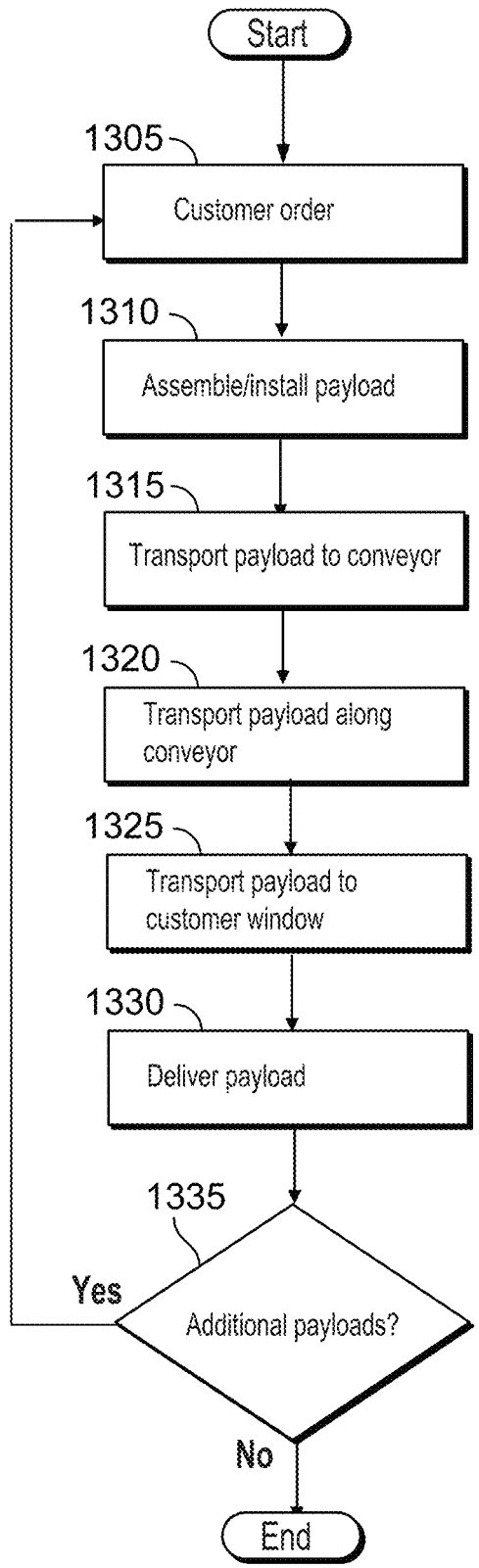
FIG. 13 shows a process flow diagram for an example method of delivering food and/or beverage payloads using an automated delivery system.

Turning now to FIG. 13, a process flow diagram for an example process of delivering food and/or beverage payloads is illustrated and described in further detail. Process 1300 may begin at block 1305, where a customer initiates an order for a food and/or beverage. Merely by way of example, a customer may place an order, e.g., at a remote order window or via a mobile device application (not shown). The customer may be directed to a drive-up automated delivery lane, e.g., in a customer delivery area 208 as illustrated in FIG. 2. Process 1300 may then proceed to block 1310.

At block 1310, a payload may be assembled and placed into an automated delivery system. In an example, personnel in a kitchen area may receive an order and complete preparation of food and/or beverages included in the order. Subsequently, the food/beverage(s) may be assembled into a payload, e.g., by being placed into one or more bags for the food, drink carrier(s) for the beverages, etc., and brought to an elevator. In some examples, a payload is installed via an access window, e.g., access window 306 or 404, to a payload tray, e.g., tray 1202. Further, as noted above in some example approaches a rail section of a laterally extending conveyor may be moveable vertically with respect to other rail sections in the conveyor, and may move from the conveyor vertically along an elevator to be positioned for placement of a payload into a tray. For example, as illustrated in FIG. 3, a rail section 310 may have a payload tray 308 configured to retain a food or beverage payload, with the rail section 310 moving vertically from an access window 306 to a laterally extending conveyor. In this example, a tray 1202 as described above in FIGS. 12A/12B may be retained with the rail section 310, i.e., with a rail carrier 1204 that positively retains the tray 1202 to the rail section 310.

Proceeding to block 1315, the payload may be transported vertically, e.g., from a kitchen area, along the vertically extending elevator. Continuing with the example in FIG. 3, rail section 310 may ascend the elevator 302 to an associated laterally extending conveyor. The rail section 310, for example, may be secured to a rail carrier such as carrier 1204, which is received within a rail 1206 extending vertically along elevator 302. Accordingly, in example approaches where a moveable rail section of a laterally extending conveyor moves vertically along an elevator, the payload may be transported to the conveyor via the rail section of the conveyor, e.g., rail section 310. The moveable rail 310 may be moved into alignment with the conveyor or other rail section(s) thereof, e.g., allowing a rail carrier 1204 to translate along the rail section 310 to an adjacent rail section of a laterally extending conveyor.

Proceeding to block 1320, the payload may be transported along the conveyor. Continuing with the example above, a rail carrier 1204 may be moved along a rail 1206, e.g., of laterally extending conveyor 204, 504, or 704, via movement imparted to a magnet within lower body 1212 of the rail carrier 1204. Accordingly, the rail carrier 1204 may move as associated tray or payload along the laterally extending conveyor 204, 504, or 704 within an enclosure thereof. To the extent a rail section, e.g., rail section 310, initially transported the payload to the conveyor, the rail section 310 may subsequently return to an access window, e.g., for a subsequent payload to be loaded. The conveyor 204, 504, or 704 may transport the payload or tray to another elevator, e.g., for vertically moving the payload. More specifically, in the example illustrated in FIG. 5, a rail section 512 may initially be aligned with rail sections 502. The rail carrier 1204 may move from the rail section 502 to the rail section 512, thereby carrying the tray 506/1202 to the rail section 512. Process 1300 may then proceed to block 1325.

At block 1325, the payload/tray may be vertically transported to a customer access window, e.g., via a vertically extending elevator. Continuing with the example illustrated in FIG. 5, the rail section 512 may be movably secured to the elevator 508, e.g., via a rail carrier 1204 (not shown in FIG. 5) fixed to the rail section 512. The rail carrier 1204 may be moved along the elevator 508, e.g., via a magnetic field imparting force upon the rail carrier 1204 of the rail section 512, thereby moving the rail section 512 downward from the conveyor 504 to the customer delivery window 514. Process 1300 may then proceed to block 1330.

At block 1330, a payload may be delivered to a customer delivery window via the elevator. Continuing with the example above in FIG. 5, rail carrier 1204 of the rail section 512 is moved to a vertical height within the customer service window 514 for retrieval by a customer (not shown in FIG. 5). In some example approaches, delivery height may be adjusted, e.g., via one or more sensors, cameras, or customer input devices. Accordingly, to the extent a customer delivery window provides different delivery positions, e.g., for different height vehicles, customers, etc., delivery height of a food/beverage payload may be modified.

Upon the customer taking the payload, the customer may drive away or otherwise leave. Door(s) of the customer service window 514 may then close, e.g., upon receipt of a signal indicating that the customer has left or that it is otherwise safe for the door(s) to be safely closed. The delivery elevator platform may be returned to a raised position adjacent the conveyor, e.g., for receipt of a subsequent order. To the extent a rail section of the conveyor is moved relative to the conveyor to deliver a payload, e.g., rail section 512, the rail section 512 may return to the conveyor 504, i.e., to alignment with the conveyor/rail sections 502. Accordingly, subsequent payloads may be moved from the conveyor 502 to the rail section 512. Process 1300 may then proceed to block 1335.

At block 1335, process 1300 may query whether additional payloads are present. For example, as the payload indicated above moves along elevator(s) and the conveyor of the automated delivery system, additional payloads may be added, e.g., by personnel at an access window of a kitchen-side elevator. Where process 1300 determines additional payloads are present, process 1300 may process back to block 1310, such that payloads are loaded into the automated delivery system and delivered as needed.

Alternatively, where process 1300 determines additional payloads are not present, process 1300 may terminate.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A system for delivering food from a kitchen, comprising:
   a first vertically extending elevator configured to transport a payload to and from the kitchen, the payload including at least one of a food or a beverage;

a laterally extending conveyor configured to transport the payload laterally from the first elevator to a second elevator, wherein the laterally extending conveyor includes one or more rail sections, wherein the payload is transported within the laterally extending conveyor along the one or more rail sections, and wherein at least one of the rail sections is configured to translate away from the laterally extending conveyor along one of the first or second vertically extending elevators; and wherein the second elevator is configured to transport the payload from the conveyor to a customer delivery window.

2. The system of claim 1, wherein the first vertically extending elevator includes an exterior wall defining an access opening to an interior of the first vertically extending elevator.

3. The system of claim 1, wherein the laterally extending conveyor is configured to move payloads independently of payload movement of the first vertically extending elevator.

4. The system of claim 1, wherein the laterally extending conveyor comprises a first rail configured to transport payloads toward the second elevator, and a second rail configured to transport payloads toward the first vertically extending elevator.

5. The system of claim 1, wherein the rail section that translates away from the laterally extending conveyor along one of the first or second vertically extending elevators is configured to realign with rail sections in the conveyor.

6. The system of claim 1, further comprising one or more payload trays configured to hold the payload.

7. The system of claim 6, wherein the trays each include:
at least two retaining walls defining an enclosed area for the payload; and
a moveable beverage holder defining a drink aperture, wherein the drink aperture is configured to maintain position of a beverage therein with respect to the tray.

8. The system of claim 1, wherein the customer delivery window defines a vertical opening extending from a lower delivery position to an upper delivery position.

9. A method of delivering food from a kitchen, comprising:
transporting a first payload from the kitchen along a first vertically extending elevator, the first payload including at least one of a food or a beverage;
laterally transporting the first payload from the first elevator along a conveyor to a second elevator, wherein transporting the first payload from the kitchen along the first vertically extending elevator includes transporting the first payload with a rail section of the conveyor;
aligning the rail section of the conveyor with one or more adjacent rail sections of the conveyor after transporting the first payload, wherein subsequent payloads may be moved from the conveyor to the rail section; and
delivering the first payload from the conveyor to a customer delivery window via the second elevator.

10. The method of claim 9, further comprising:
transporting a second payload from the delivery window via the second the elevator to the conveyor;
laterally transporting the second payload from the second elevator to the first elevator via the conveyor; and
delivering the second payload from the conveyor to the kitchen.

11. The method of claim 9, wherein laterally transporting the first payload from the first elevator along the conveyor includes transporting the first payload along a first rail toward the second elevator.

12. The method of claim 11, further comprising laterally transporting a second payload along a second rail toward the first vertically extending elevator.

13. The method of claim 9, further comprising providing an access opening in an exterior wall of the first vertically extending elevator, the access opening configured to permit movement of payloads to an interior of the first vertically extending elevator.

14. The method of claim 9, wherein the customer delivery window defines an opening extending from a lower delivery position to an upper delivery position.

15. The method of claim 9, wherein transporting the first payload along the second elevator includes transporting the first payload with the rail section of the conveyor.

16. The method of claim 15, further comprising aligning the rail section of the conveyor with one or more adjacent rail sections of the conveyor after transporting the first payload, wherein subsequent payloads may be moved from the conveyor to the rail section.

17. A system for delivering food from a kitchen, comprising:
a first vertically extending elevator configured to transport a payload to and from the kitchen, the payload including at least one of a food or a beverage;
a laterally extending conveyor configured to transport the payload laterally from the first elevator to a second elevator; and
wherein the second elevator is configured to transport the payload from the conveyor to a customer delivery window, wherein the customer delivery window defines a vertical opening extending from a lower delivery position to an upper delivery position.

18. The system of claim 17, wherein a range between the upper delivery position and the lower delivery position allows for different heights for customer accessibility with respect to the payload.

19. The system of claim 17, wherein the customer delivery window comprises one or more closure mechanisms, and wherein the closure mechanism remains closed unless the payload is ready to be unloaded.

20. The system of claim 19, wherein the closure mechanism comprises a door or a curtain.

21. A method of delivering food from a kitchen, comprising:
transporting a first payload from the kitchen along a first vertically extending elevator, the first payload including at least one of a food or a beverage;
laterally transporting the first payload from the first elevator along a conveyor to a second elevator, wherein transporting the first payload along the second elevator includes transporting the first payload with a rail section of the conveyor;
aligning the rail section of the conveyor with one or more adjacent rail sections of the conveyor after transporting the first payload, wherein subsequent payloads may be moved from the conveyor to the rail section; and
delivering the first payload from the conveyor to a customer delivery window via the second elevator.

22. The method of claim 21, further comprising:
transporting a second payload from the delivery window via the second the elevator to the conveyor;
laterally transporting the second payload from the second elevator to the first elevator via the conveyor; and
delivering the second payload from the conveyor to the kitchen.

23. The method of claim 21, wherein laterally transporting the first payload from the first elevator along the conveyor includes transporting the first payload along a first rail toward the second elevator.

24. The method of claim 23, further comprising laterally transporting a second payload along a second rail toward the first vertically extending elevator.

25. The method of claim 21, wherein transporting the first payload from the kitchen along the first vertically extending elevator includes transporting the first payload with the rail section of the conveyor.

26. A method of delivering food from a kitchen, comprising:

transporting a first payload from the kitchen along a first vertically extending elevator, the first payload including at least one of a food or a beverage;

laterally transporting the first payload from the first elevator along a conveyor to a second elevator, wherein laterally transporting the first payload from the first elevator along the conveyor includes transporting the first payload along a first rail toward the second elevator;

delivering the first payload from the conveyor to a customer delivery window via the second elevator; and laterally transporting a second payload along a second rail toward the first vertically extending elevator.

27. The method of claim 26, wherein delivering the first payload from the conveyor to a customer delivery window via the second elevator comprises transferring the first payload from the first rail to a rail section of the second elevator.

28. The method of claim 27, further comprising vertically translating the first payload on the rail second to the customer delivery window via a movable platform.

29. The method of claim 27, further comprising transferring the second payload from the rail section of the second elevator to the second rail.

30. The method of claim 26, further comprising transferring the first payload from the first elevator to the first rail via a rail section of the first elevator.

31. The method of claim 30, further comprising transferring the second payload from the second rail to the first elevator via the rail section of the first elevator.

* * * * *